United States Patent
Weatherston

(10) Patent No.: US 8,424,069 B2
(45) Date of Patent: Apr. 16, 2013

(54) METHOD AND SYSTEM FOR AUTHENTICATING SUBACCOUNT USERS

(75) Inventor: Kevin Weatherston, Kelowna (CA)

(73) Assignee: Disney Enterprises, Inc., Burbank, CA (US)

( * ) Notice: Subject to any disclaimer, the term of this patent is extended or adjusted under 35 U.S.C. 154(b) by 371 days.

(21) Appl. No.: 12/592,204

(22) Filed: Nov. 20, 2009

(65) Prior Publication Data

US 2011/0126266 A1    May 26, 2011

(51) Int. Cl.
*H04L 29/06*    (2006.01)

(52) U.S. Cl.
USPC .................................. 726/7; 726/6

(58) Field of Classification Search .................. 726/5, 6, 726/7, 8, 18, 19; 713/182, 183
See application file for complete search history.

(56) References Cited

U.S. PATENT DOCUMENTS

2002/0184496 A1* 12/2002 Mitchell et al. ............... 713/168
2007/0028309 A1*  2/2007 Gudorf et al. .................. 726/28

* cited by examiner

*Primary Examiner* — Edward Zee
(74) *Attorney, Agent, or Firm* — Farjami & Farjami LLP

(57) ABSTRACT

There is provided a method and system for authenticating users to an application. The method comprises receiving a master account identifier corresponding to a master account associated with the application. The method further comprises determining if at least one subaccount is assigned to the master account. The method comprises requesting a master password if at least one subaccount is not assigned to the master account. Finally, the method includes requesting a subaccount identifier and a subaccount password if at least one subaccount is assigned to the master account.

18 Claims, 3 Drawing Sheets

METHOD AND SYSTEM FOR AUTHENTICATING SUBACCOUNT USERS

BACKGROUND OF THE INVENTION

1. Field of the Invention

The present invention relates to computer mediated systems and applications. More specifically, the present invention relates to the authentication of users of computer mediated systems and applications.

2. Background Art

Authentication issues plague developers of computer systems and applications. Particularly difficult is the creation of effective identity verification procedures in information systems. One authentication paradigm that has emerged is the traditional web login procedure. In the traditional web login procedure, a user or entity who requests access provides a set of credentials to the system. The credentials usually consist of a unique username or e-mail address and a password. The credentials are usually linked to a user account. After the credentials are entered, an authentication server verifies the credentials, and either allows or denies access to the computer system or application based on the credentials.

However, traditional web login procedures insufficiently accommodate the authentication needs of children and other subaccount holders. Children and other subaccount holders frequently depend financially and physically on other entities, for example parents, for access to computer systems and applications. Federal, state and local regulations may require that the identities of children or other subaccount holders be concealed from an application or from other users of a network. Additionally, children and other subaccount holders often require authentication procedures that protect them from commercial solicitation or harassment. Finally, children and other subaccount holders may seek to access specialized content that adults and other master account holders find uninteresting. Unfortunately, the use of unique usernames to identify children and other subaccount holders under these circumstances may crowd the namespace of a computer system or application or may lead to the use of forgettable or bland usernames.

Accordingly, there is a need to overcome the drawbacks and deficiencies in the art by providing a solution that enables the authentication of the credentials of children and other subaccount holders to computer and information systems and applications.

SUMMARY OF THE INVENTION

There are provided methods and systems for authenticating subaccount users substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
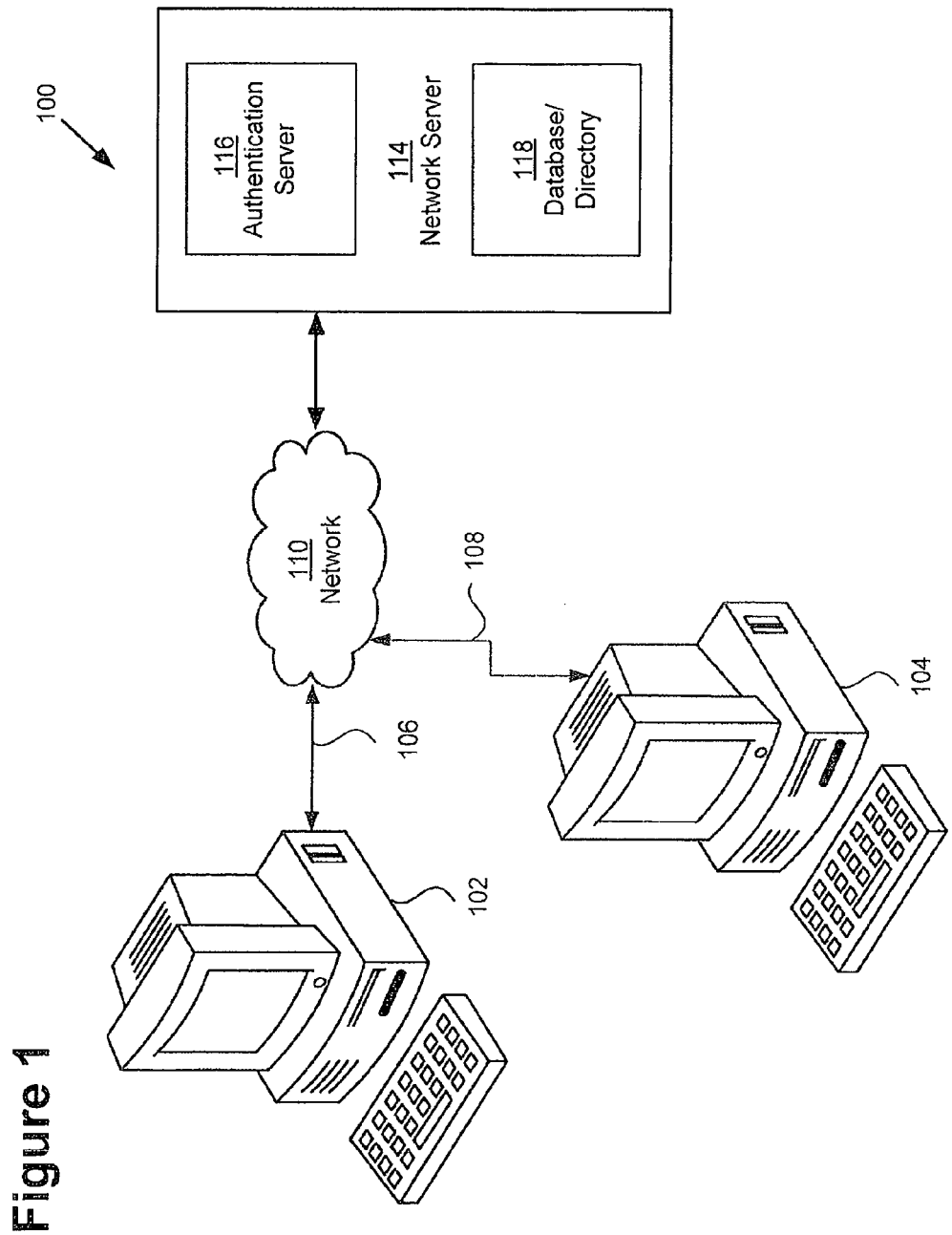
FIG. 1 shows a high-level block diagram of a system for authenticating subaccount users, according to one embodiment of the present invention.

The present application is directed to a method and system for authenticating subaccount users. The following description contains specific information pertaining to the implementation of the present invention. One skilled in the art will recognize that the present invention may be implemented in a manner different from the manner specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Embodiments of the present invention create an effective, convenient authentication system for adults, children, and members of an organization to access computer systems and applications. FIG. 1 shows a high-level block diagram of a system for authenticating subaccount users in the context of network environment 100. As illustrated in FIG. 1, users may connect to computer systems and applications through a client, for example client 102 or second client 104. In a typical embodiment of the present invention, client 102 and second client 104 may be connected through respective network connections 106 and 108 to network 110. Network 110 may allow client 102 and second client 104 to share resources or information. Network 110 may further allow clients, for example client 102 and second client 104 to communicate with other computers, and access computer systems and applications stored on a server, for example, server 114.

In one embodiment of the present invention illustrated in FIG. 1, client 102, second client 104 and server 114 may reside on separate computers. Each separate computer may include, for example, computer hardware including a processor, memory, address and data buses, and input and output modules. Each separate computer may also include an operating system, system software, application software, and networking capabilities.

Server 114 may incorporate an authentication server, for instance authentication server 116, and a database or directory, for example database/directory 118. Authentication server 116 can function to authenticate users of computer systems and applications, including for example, operating systems, online accounts, social networking software and computer games. In this capacity, authentication server 116 can be configured to receive words or character strings corresponding to authentication parameters. For example, authentication server 116 may be configured to receive a username corresponding to an account. Authentication server 116 may also be configured to receive a password corresponding to an account. Thus, in accordance with embodiments of the present invention, authentication server may be configured to receive information corresponding to user accounts that have permissions to access the protected computer systems and applications.

Similarly, database/directory 118 may be configured to store information of users who wish to access the protected computer systems and applications. Although FIG. 1 illustrates database/directory outside authentication server 116, it bears mention that authentication server 116 may incorporate the storage capacity and functionality of database/directory 118 in other embodiments of the present invention.

Moreover, consistent with embodiments of the present invention, clients, for example client 102 and second client 104 may reside on the same computer or system as one another or as server 114. Clients, for example client 102 and second client 104, may also correspond to client applications on a given computer. Server 114 may correspond to a server application on the same computer. Network 110 in an embodiment of the present invention could be, for example, software or a datapath that links server 114 to clients, for example client 102 and second client 104.

Figure 2:
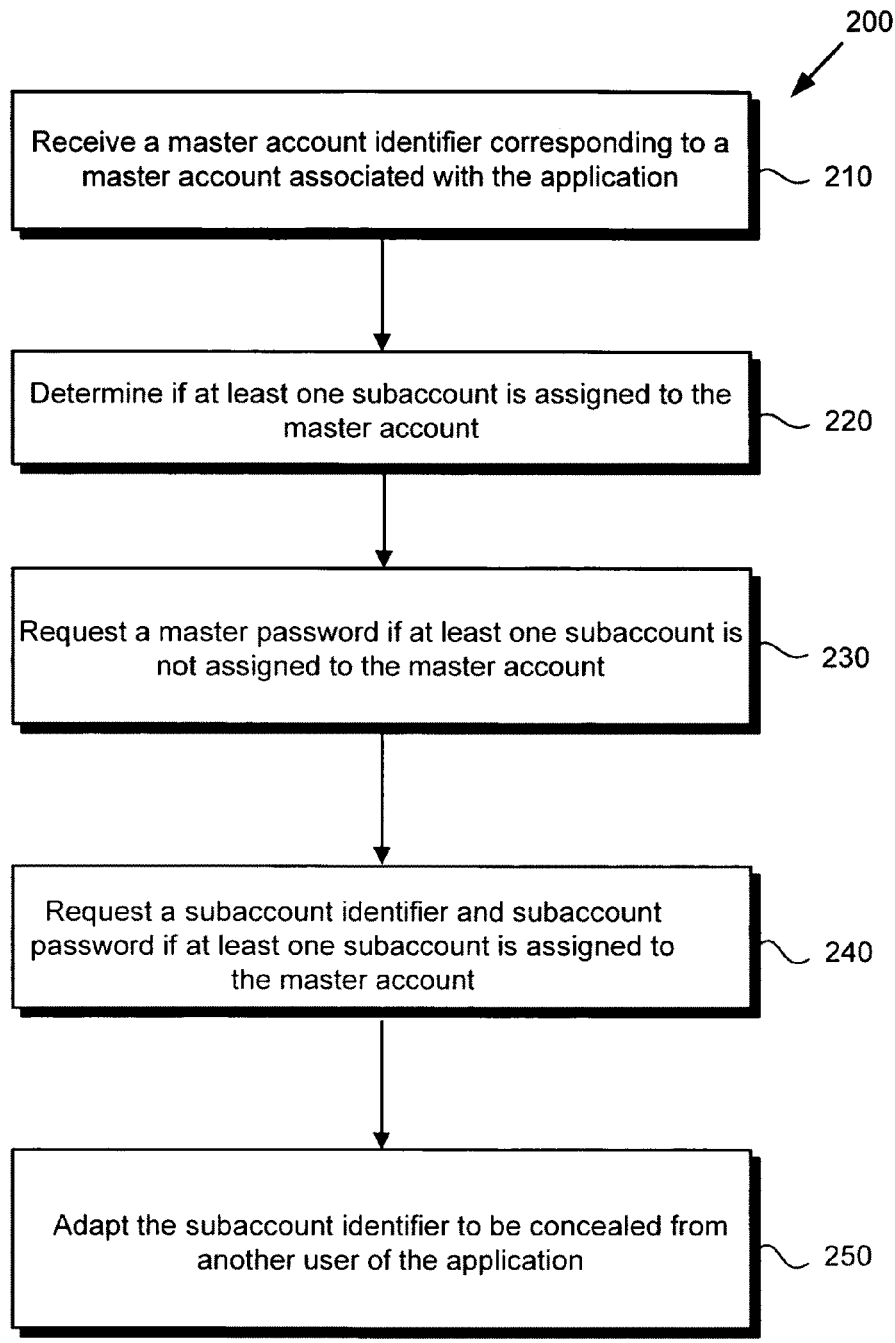
FIG. 2 presents a flowchart of a method for authenticating subaccount users, according to one embodiment of the present invention.
Figure 3:
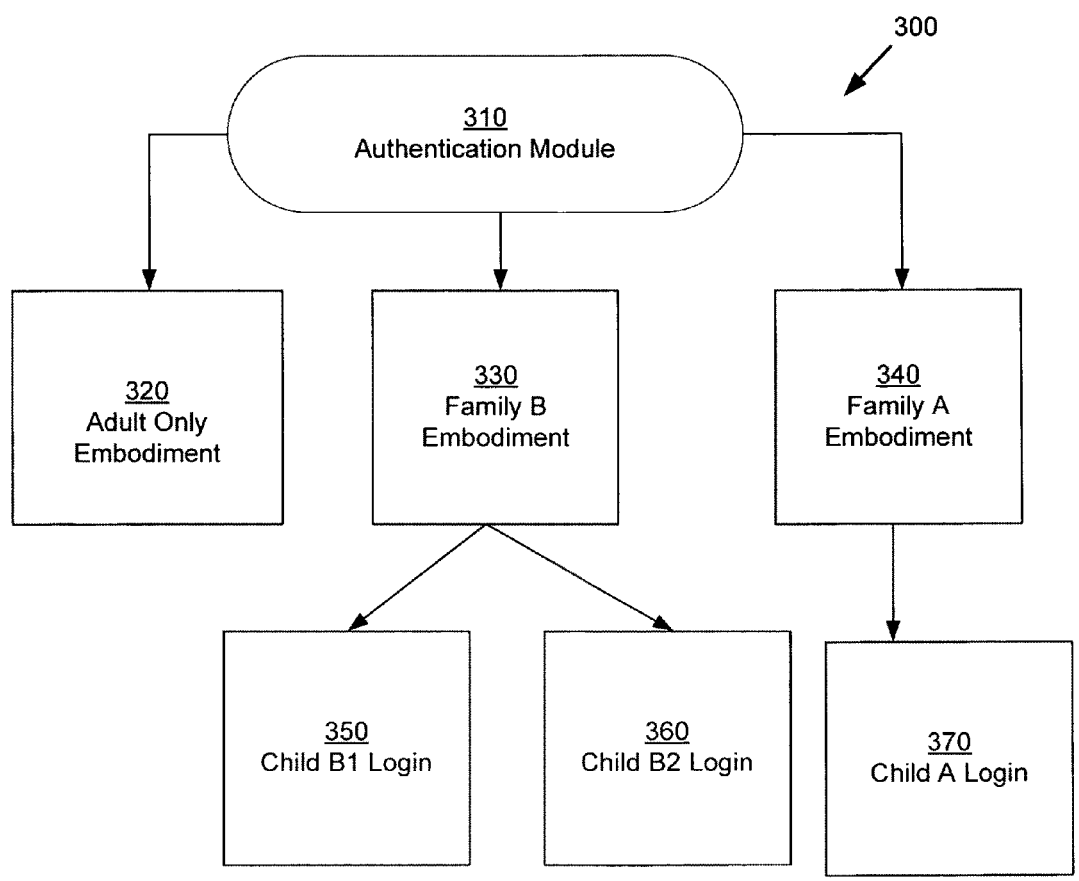
FIG. 3 illustrates several potential configurations for authenticating subaccount users, according to embodiments of the present invention.

The functionality and advantages attributable to the method and system for authenticating subaccount users illustrated in FIG. 1 will now be described further in conjunction with FIGS. 2 and 3. FIG. 2 presents flowchart 200, which details a method for authenticating subaccount users according to one embodiment of the present invention. The steps shown in flowchart 200 are merely exemplary, however, so that a step may comprise one or more substeps or may include specialized techniques, as may be known in the art. While steps 210 to 250 indicated in flowchart 200 are sufficient to describe one embodiment of the present invention, other embodiments may utilize steps different from those shown in flowchart 200, or may include more or fewer steps. FIG. 3 presents listing 300, which illustrates embodiments that may be used to authenticate subaccount users according to the present invention.

Turning to step 210 of flowchart 200, step 210 comprises receiving a master account identifier corresponding to a master account associated with the computer system or application. A master account identifier may be a word or character string that is used to identify a master account for which access is requested to the computer system or application. Consistent with embodiments of the present invention, a master account may be unlike a subaccount in that a master account may have control over subaccounts, or may have privileges that subaccounts lack. A master account may, for example, correspond to the account of a parent or adult.

In one embodiment of the present invention, the master account identifier may be unique. That is, embodiments of the present invention may require that no two master account identifiers be equal.

A master account identifier may correspond to a communications address from which a user may send or receive a message. For example, a master account identifier may correspond to the email address or mobile phone number of a user. As illustrated in the context of the present invention, these unique words or character strings may be used to identify the master account for the purposes of authentication.

In one embodiment of the present invention, the master account identifier may be adapted to be received by manual input. For example, clients, including client 102 or second client 104, may include a keyboard, a touchscreen device, or other input device. A user may enter his or her master account identifier into the keyboard, touchscreen device or input device. The inputted data could be transmitted to authentication server 116 via network 110.

Alternatively, in an embodiment of the present invention, the master account identifier may be adapted to be received through web cookie technology. In a web cookie embodiment of the present invention, a web cookie, tracker, or text block may be stored on a user's computer, for instance client 102 or second client 104. The web cookie could be stored on, for example, an Internet browser present in client 102 or second client 104. Thus, during step 210, a web cookie may hold the master account identifier for transmission to authentication server 116.

In one embodiment of the present invention, the master account identifier may correspond to a master account through an association module or routine. As illustrated in FIG. 1, the master account may reside on a database, for example database/directory 118. Authentication server 116 may run an association module or routine to compare the master account identifier with a list of master accounts contained in database/directory 118. The association module or routine may return the name or location of a master account if the master account identifier corresponds with a master account.

Turning to step 220 of flowchart 200, step 210 comprises determining if at least one subaccount is assigned to the master account. As detailed above, a subaccount may be distinguished from a master account due to lack of control over other subaccounts or lack of privileges that characterize a master account. In an embodiment of the present invention, a subaccount could correspond to the account of a child or other user dependent on the control or privileges of another account holder.

In an embodiment of the present invention, a list of subaccounts may be stored in a database, for instance database/directory 118 within network server 114. Authentication server 116 may include a routine or module to indicate whether the referenced master account contains a subaccount under it.

Turning to step 230 of flowchart 200, step 230 comprises requesting a master password if at least one subaccount is not assigned to the master account. FIG. 1 illustrates, consistent with an embodiment of the present invention, that authentication server 116 can be configured to request a master password from clients, for example client 102 and second client 104. The master password request can be sent over network 110. Clients, for example, client 102 and second client 104, may be configured to respond to the master password request with a word or character string corresponding to the master password which in turn is associated with the entered master account identifier.

As illustrated in FIG. 3, if at least one subaccount is not assigned to the master account, authentication module 310 may progress to adult only embodiment 320. Adult only embodiment 320, in the context of FIG. 1, may require authentication server 116 to return information to clients for example client 102 and second client 104 to display a login screen consistent with an adult only login. For example, authentication server 116 may direct either client 102 or second client 104 to prompt a user for a master password. Alternatively, the master password may be retrieved using technology consistent with web cookie or web tracking technology.

Turning to step 240 of flowchart 200, step 240 comprises requesting a subaccount identifier and a subaccount password if at least one subaccount is assigned to the master account. A subaccount identifier may be a word or character string that is used to identify a subaccount for which access is requested to the computer system or application.

In accordance with one embodiment of the present invention, the subaccount identifier need not be unique in comparison to subaccount identifiers within other master accounts.

For example, a subaccount identifier corresponding to a child or other subaccount user named may be duplicated in another master account. The ability to duplicate subaccount identifiers across master accounts limits the number of subaccount identifiers needed by the computer system or application to accommodate children or other subaccount holders. The ability to duplicate also allows the creation of memorable subaccount identifiers. Thus, two families with children named Jack and Nora may, under embodiments of the present invention, be able to create subaccount identifiers with the names "Jack" and "Nora."

The subaccount identifier and the subaccount password may be received by manual input. Clients, for example client 102 and second client 104, may have a keyboard, a touchscreen device, or other input device. A user may enter his or her subaccount identifier and subaccount password into the keyboard, touchscreen device or input device. The inputted data could be transmitted to authentication server 116 via network 110.

Alternatively, the subaccount identifier and the subaccount password may be retrieved through web cookie technology. In a web cookie embodiment of the present invention, a web cookie, tracker, or text block may be stored on a client, for example client 102 or second client 104. The web cookie could be stored on, for example, an Internet browser present in client 102 or second client 104. During step 210, a web cookie may hold the subaccount identifier and the subaccount password in the client for the purpose of transmission to authentication server 116.

In one embodiment of the present invention, the subaccount identifier and the subaccount password may be associated with a subaccount through an association module or routine. As illustrated in FIG. 1, the subaccount identifier and the subaccount password may reside on a database, for example database/directory 118. Authentication server 116 may run an association module or routine to compare the subaccount identifier and the subaccount password with the data from a list of subaccounts contained in database/directory 118. The association module or routine may return the name or location of a subaccount if the subaccount identifier and the subaccount password corresponds with a valid subaccount.

FIG. 3 further illustrates family A embodiment 340 and family B embodiment 330 consistent with the present invention. Turning to family A embodiment 340, family A embodiment 340 illustrates a module for use with a family with only one child or subaccount holder. Under family A embodiment 340, authentication server 116 may be configured to return information to a clients, for example client 102, to display a login screen consistent with a family A login. For example, authentication server 116 may direct a client, for example client 102, to prompt a user for a subaccount password corresponding to child A login module 370. Alternatively authentication server 116 may direct clients, for example client 102, to display the only subaccount identifier associated with the master account. In such a case, the sole child or subaccount holder associated with the entered master account could use a client, for example client 102, to access a multitude of computer systems and applications.

Turning to family B embodiment 330, family B embodiment 330 illustrates a module for use with a family with a plurality of children or subaccount holders. As illustrated in FIG. 3, family B embodiment 330 may prompt, for example, child $B_1$ login module 350 or child B2 login module 360. Under such an embodiment, authentication server 116 may be configured to return multi-user information to a client, for example second client 104, to display screen information consistent with a multi-family member login. Authentication server 116 may direct a client, for example second client 104, to prompt users for a subaccount identifier and a subaccount password. Alternatively, authentication server 116 may direct clients, including second client 104, to display a list of stored subaccount identifiers associated with the master account. In such a case, the multiple children or subaccount holders associated with the entered master account could use a client, for example client 104, to access a multitude of computer systems and applications.

Turning to step 250 of flowchart 200, step 250 comprises adapting the subaccount identifier to be concealed from another user of the computer systems or application. In the context of FIG. 1, step 250 may be implemented by a request from authentication server 116 to the computer system or application for which access is requested (not shown). For example, authentication server 116 may encode the subaccount identifier with additional characters or data strings that indicate a need to conceal the subaccount identifier from another user of the computer system or application.

Consistent with embodiments of the present invention, an adult, master account holder, child, or subaccount holder who accesses the computer system or application through client 102 will not be able to access the subaccount identifier of a child or a subaccount user who accesses the computer system or application through second client 104. Thus, in accordance with embodiments of the present invention, child users under the age of 13 who wish to access the computer system or application need not reveal their identities to other users of the computer system or application Thus, the present application discloses a method and system for authenticating subaccount users. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for execution on a processor of an authentication server for authenticating users to access an application over a network, the method comprising:
   receiving, from a user over the network, a master account identifier corresponding to a master account associated with the application;
   determining, utilizing a directory residing on the authentication server, if at least one subaccount is assigned to the master account;
   requesting, from the user over the network, a master password if at least one subaccount is not assigned to the master account; and
   requesting, from the user over the network, a subaccount identifier and a subaccount password if at least one subaccount is assigned to the master account.

2. The method of claim 1, wherein the subaccount identifier is configured to be concealed from another user of the application.

3. The method of claim 1, wherein the master account identifier corresponds to an e-mail address or a mobile phone number.

4. The method of claim 1, wherein a web cookie is used to collect the master account identifier or the master password.

5. The method of claim 1, wherein a web cookie is used to collect the subaccount identifier or the subaccount password.

6. The method of claim 1, wherein the at least one subaccount consists of one subaccount.

7. The method of claim 1, wherein the at least one subaccount comprises a plurality of subaccounts.

8. The method of claim 1, wherein each of the at least one subaccount identifiers for the master account is different.

9. The method of claim 1, wherein the at least one subaccount corresponds to a user under the age of thirteen.

10. An authentication server for authenticating subaccount users to access an application over a network, the authentication server comprising:
   a memory configured to store a master account identifier, a master password, a subaccount identifier, and a subaccount password; and
   a processor configured to:
      receive, from a user over the network, the master account identifier corresponding to a master account associated with the application;
      determine, utilizing a directory residing on the authentication server, if at least one subaccount is assigned to the master account;
      request, from the user over the network, the master password if at least one subaccount is not assigned to the master account; and
      request, from the user over the network, the subaccount identifier and the subaccount password if at least one subaccount is assigned to the master account.

11. The authentication server of claim 10, wherein the processor is further configured to adapt the subaccount identifier to be concealed from another user of the application.

12. The authentication server of claim 10, wherein the master account identifier corresponds to an e-mail address or a mobile phone number.

13. The authentication server of claim 10, wherein a web cookie is used to collect the master account identifier or the master password.

14. The authentication server of claim 10, wherein a web cookie is used to collect the subaccount identifier or the subaccount password.

15. The authentication server of claim 10, wherein the at least one subaccount consists of one subaccount.

16. The authentication server of claim 10, wherein the at least one subaccount comprises a plurality of subaccounts.

17. The authentication server of claim 10, wherein each of the at least one subaccount identifiers for the master account is different.

18. The authentication server of claim 10, wherein the at least one subaccount corresponds to a user under the age of thirteen.

* * * * *